United States Patent
Gebhart

[19]

[11] Patent Number: 6,041,911

[45] Date of Patent: Mar. 28, 2000

[54] APPARATUS FOR SORTING BLOCKS

[76] Inventor: Hans Gebhart, Unter der Halden 15, D-87700 Memmingen, Germany

[21] Appl. No.: 09/005,651

[22] Filed: Jan. 12, 1998

[30]  Foreign Application Priority Data

Jan. 16, 1997 [DE] Germany ................ 297 00 711 U

[51] Int. Cl.[7] .................................................. B65G 27/00
[52] U.S. Cl. .............................................................. 198/446
[58] Field of Search ................................ 198/383, 384, 198/390, 406, 416, 446

[56]  References Cited

U.S. PATENT DOCUMENTS

| | | | |
|---|---|---|---|
| 2,324,246 | 7/1943 | Thompson et al. ................ | 198/446 |
| 2,456,031 | 12/1948 | Spain ............................. | 198/446 |
| 3,469,672 | 9/1969 | Stutske et al. ................... | 198/446 X |
| 4,362,236 | 12/1982 | Hedel ............................. | 198/446 |
| 4,385,700 | 5/1983 | Hodges et al. ................... | 198/446 X |
| 5,123,516 | 6/1992 | Moore ............................. | 198/446 X |

*Primary Examiner*—James R. Bidwell
*Attorney, Agent, or Firm*—Welsh & Katz, Ltd.

[57]  ABSTRACT

An apparatus for sorting blocks made of concrete or concrete-like material, in particular paving slabs, having a vibration arrangement and a sorting arrangement which slopes with respect to the horizontal, has an entry part for the blocks which are to be sorted and a sorting part, which has at least one collecting channel running in the conveying direction. The collecting channel has a central part and two lateral run-on surfaces arranged thereon, the width of the central part corresponding at least approximately to one of the two shorter edge lengths of the blocks which are to be sorted. The run-on surfaces are provided with stop elements, the stop elements on one run-on surface being offset in the longitudinal direction with respect to the stop elements on the other run-on surface.

11 Claims, 1 Drawing Sheet

APPARATUS FOR SORTING BLOCKS

The invention relates to an apparatus for sorting blocks made of concrete or concrete-like material, in particular paving slabs, having a vibration arrangement and a sorting arrangement which slopes with respect to the horizontal and has an entry part for the blocks which are to be sorted and a sorting part, which has at least one collecting channel running in the conveying direction.

DE 35 26 782 A1 discloses an apparatus for artificially ageing paving slabs made of concrete or concrete-like material and which is adjoined by a sorting arrangement which has a plurality of collecting channels alongside one another.

The disadvantage with the collecting means described in this document, however, is that, at the entrance into the collecting channels and also in the collecting channels themselves, the blocks can jam, and the conveying operation is thus interrupted again and again.

G 92 15 916 likewise describes an apparatus for artificially ageing paving slabs made of concrete. In this case, a receiving platform which is inclined obliquely with respect to the horizontal is provided downstream of the sorting arrangement in the conveying direction.

However, the problem of the blocks jamming in the collecting channels cannot be solved by this measure either.

The object of the invention is thus to provide an apparatus for sorting blocks which ensures, in a simple and reliable manner, that, once they have run through the sorting arrangement, all the blocks which are to be sorted are located in the same desired position and can thus be stacked, package or palletized without any difficulty thereafter.

This object is achieved according to the invention in that the collecting channel has a central part and two lateral run-on surfaces arranged thereon, the width of the central part corresponding at least approximately to one of the two shorter edge lengths of the blocks which are to be sorted, and in that the run-on surfaces are provided with stop elements, the stop elements on one run-on surface being offset in the longitudinal direction with respect to the stop elements on the other run-on surface.

As a result of the central part according to the invention with the lateral run-on surfaces arranged thereon, the blocks remain in the central part and cannot turn any longer once they have been aligned. This is ensured in that the width of the central part corresponds at least approximately to one of the two shorter edge lengths of the block. The blocks can thus be aligned in the sorting arrangements in accordance with their width or their height, this alignment being matched with their subsequent packaging method.

The operation of turning the blocks such that all of the blocks are aligned in the same way is carried out by the stop elements according to the invention, around which the blocks turn and thus pass into the central part.

The fact that the invention provides for the stop elements to be offset in the longitudinal direction means that the blocks cannot jam on the stop elements themselves. Rather, this advantageously provides for the blocks to be turned reliably in the desired manner.

In a development of the invention, it may be provided that each stop element arranged on one run-on surface is spaced apart from the next stop element in the conveying direction, which is arranged on the other run-on surface, by a distance which corresponds at least to the width of the blocks which are to be sorted.

This arrangement of the stop elements advantageously prevents jamming of the blocks within the collecting channel. This is because the stop elements are arranged such that it is not possible for an individual block to come into contact with two stop elements at the same time.

It may, furthermore, advantageously be provided that the distance between the stop elements arranged on one run-on surface and the opposite lateral border of the central part corresponds at most to the length of the blocks which are to be sorted.

In this embodiment, the block butts, by way of its shorter edge length or its width, against the lateral border of the central part and, at the same time, comes into contact with a stop element by way of its longer edge length or its longitudinal side. This achieves even more reliable turning of the blocks, and thus the same alignment of all the blocks located in the sorting arrangement.

If the run-on surfaces are sloping run-on surfaces, this has the advantage of ensuring that the blocks slide downwards into the central part from the sloping run-on surfaces.

A simple embodiment for the stop elements which is advantageous for the functioning of the apparatus may be achieved in that the stop elements are stop pins which project from the sloping run-on surfaces.

In a development of the invention, the functioning of the stop pins can be improved in that they are arranged essentially perpendicularly with respect to the base of the sorting part.

A further advantageous embodiment of the invention may consist in that the stop elements are designed as stop cones.

This permits reliable turning of the blocks with, at the same time, simple stop-element design and fitting.

In a development of the invention, it may be provided that a plurality of collecting channels are arranged parallel alongside one another, the sloping run-on surfaces between adjacent connecting channels being designed at least approximately in roof form or trapezoidal form.

This gives a particularly space-saving sorting arrangement which has a high capacity for receiving blocks which are to be sorted, but in which the blocks cannot pass from one collecting channel into the other.

In an advantageous configuration of the invention, it may further be provided that a strip is arranged between the entry part and the sorting part such that, between the base of the entry part and the strip, there is a through-passage which corresponds at least to the height of the blocks which are to be sorted.

This prevents blocks which are to be sorted from being able to pass into the collecting channels in an upended state. This is because this strip overturns the blocks arriving in the entry part, with the result that they come to rest on their largest surface. This is assisted by the vibrations of the vibration arrangement.

With certain block shapes, in particular if there are no significant differences between the height, width and length of the blocks, it may be advantageous if a further sorting arrangement is arranged downstream of the sorting arrangement in the conveying direction.

Blocks which may arrive at the end of the collecting channel in an upended state can then be sorted subsequently by this additional sorting arrangement.

In a further advantageous embodiment of the invention, it may be provided that the vibration arrangement has a motor which is provided with unbalance elements which are arranged on a shaft, which has a horizontal axis.

Alternatively, it may be provided according to the invention that the vibration arrangement has two motors which run in opposite directions and are each provided with an unbalance element, each of which is arranged on a shaft, which has a horizontal axis, for producing directed vibration.

This produces vibrations, on the base of the sorting arrangement, which are aligned in the vertical direction and in the longitudinal direction of the collecting channels. In particular, the vibrations in the vertical direction raise the blocks slightly from the base again and again, this preventing jamming of the blocks even more effectively. The vibrations in the entry part cause the blocks to be overturned, with the result that, even before they have entered into the collecting channels, these blocks can only come to rest on their largest surface. The vibration produced in the case of two motors is directed to the center point of the sorting arrangement, this detaching the blocks from the base particularly well.

An exemplary embodiment of the invention is described in principle hereinbelow with reference to the drawing, in which.

Figure 1:
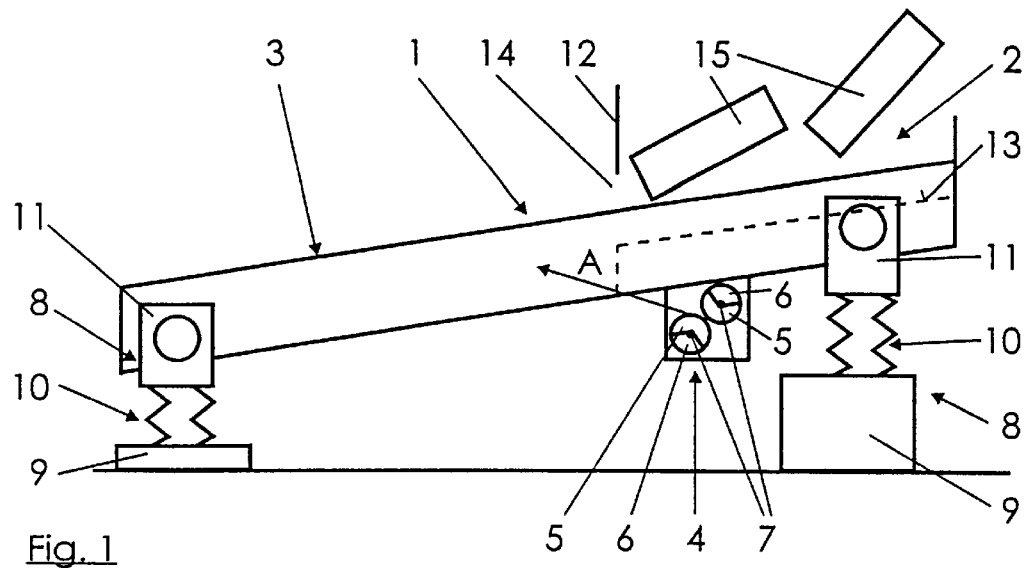
FIG. 1 shows a side view of a sorting arrangement according to the invention.

FIG. 1 illustrates a sorting arrangement 1 with an entry part 2 and a sorting part 3. Located on the underside of the sorting arrangement 1 is a vibration arrangement 4 which, in this case, has two motors 5 each with one unbalance element 6 arranged thereon. The unbalance elements 6 are each located on a shaft 7, which has a horizontal axis. The vibration arrangement 4 configures vibrations in the vertical direction and in the longitudinal direction of the sorting arrangement 1. The two motors 5 run in opposite directions here, as a result of which, depending on the positioning of the motors 5 and on the arrangement of the unbalance elements 6 on the motors 5, directed vibration is produced. As is illustrated by the arrow A, the vibration in this case is directed to the center of the sorting arrangement 1. If the arrow A is regarded as a vector, the directed vibration may also be referred to as vector vibration.

The sorting arrangement 1 is aligned obliquely with respect to the horizontal, there being arranged beneath the entry part 2 a damping arrangement 8 which comprises a base part 9, a spring device 10 and a fastening part 11, which connects the damping arrangement 8 to the sorting arrangement 1. Such a damping arrangement 8 is also arranged at the outlet of the sorting part 3. The damping arrangement 8 transmits to the sorting arrangement 1 as a whole vibrations produced by the vibration arrangement 4.

The strip 12 is fitted between the entry part 2 and the sorting part 3, and above the same, such that a through-passage 14 remains between the base 13 of the entry part 2 and the strip 12. The strip 12 prevents blocks 15 which are to be sorted from being able to pass into the sorting part 3, through the through-passage 14, from the entry part 2 in an upended state.

Figure 2:
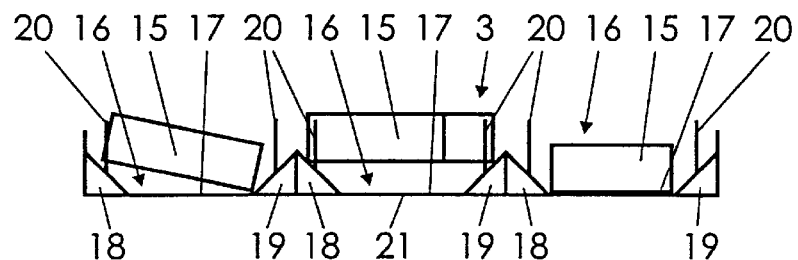
FIG. 2 shows the front view of the sorting arrangement.

FIG. 2 shows a front view of the sorting arrangement 1, but the entry part 2 is not illustrated. The sorting part 3 has a plurality of collecting channels 16 which each have a central part 17 and lateral run-on surfaces 18, 19 arranged thereon. The width of the central part 17 corresponds at least approximately to one of the two shorter edge lengths of the block 15. In most cases, this is the width of the block 15, although the width of the central part 17 may also correspond to the height of the block 15.

Fitted on the run-on surfaces 18, 19 are stop elements which are designed as stop pins 20 and are aligned essentially perpendicularly with respect to the base 21 of the sorting part 3. It is also possible for the stop elements to be designed as stop cones, but this is not illustrated.

If, as is illustrated in FIG. 2, a plurality of collecting channels 16 are arranged alongside one another, the adjacent run-on surfaces 18, 19 give a roof form. It is thus not possible for the blocks 15 to pass from one collecting channel 16 into an adjacent collecting channel 16. Of course, if required, there is also the possibility (not illustrated) of adjacent run-on surfaces giving a trapezoidal form. In this case, it would also be possible for the abovedescribed stop cones to be arranged on the resulting plateau of the trapezoidal form.

Figure 3:
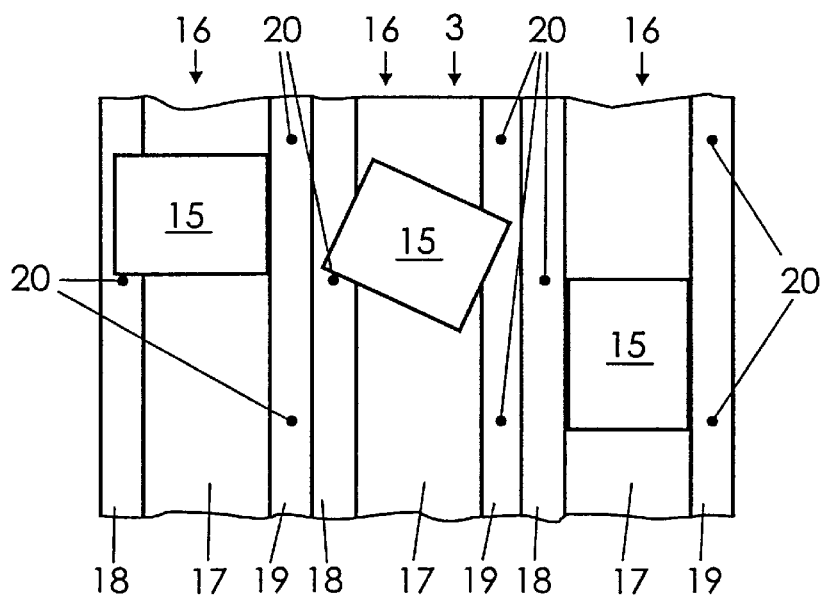
FIG. 3 shows the plan view of the sorting arrangement.

The plan view of the sorting part 3 of the sorting arrangement 1 which is illustrated in FIG. 3 shows three blocks 15, which are each located in a collecting channel 16. As soon as the blocks 15 have reached various positions within the collecting channel 16, it is possible to see how the sorting arrangement 1 functions as it sorts blocks 15.

In addition, the distances between the stop pins 20 are illustrated in FIG. 3. Thus, a stop pin 20 arranged on the run-on surface 18 is spaced apart from the next stop pin 20 in the conveying direction, which is arranged on the run-on surface 19, by a distance which corresponds at least to the width of the blocks 15 which are to be sorted. This prevents jamming of the blocks 15 in the collecting channel 16.

The lateral border of the central part 17 is spaced apart from the opposite stop pin 20 by a distance which is smaller than, or at most of equal size to, the length of the blocks 15. As a result, each block 15 which is not yet aligned in its longitudinal direction in the collecting channel 16, and is thus located in the central part 17, is forced against one of the stop pins 20 by way of its longer edge length or longitudinal side. Since that shorter side of the block 15 which is located opposite the stop pin 20 butts against the border of the central part 17, the block 15 turns around the stop pin 20 and, in doing so, slides downwards from the two run-on surfaces 18, 19. This turning movement continues until the block 15 is located entirely in the central part 17 and is thus aligned in the longitudinal direction.

After having run through the sorting arrangement 1, the block 15 can be stacked, packaged or palletized by appropriate means (not illustrated) in a known manner.

Of course, the sorting arrangement 1 may be adapted to various sizes of blocks 15, and even the position of the stop pins 20 on the run-on surfaces 18, 19 as well as the run-on surfaces 18, 19 themselves can be adapted to the various sizes of blocks 15 which are to be sorted. For this purpose, it is possible either for the sorting arrangement 1 to be converted or for a completely new sorting arrangement 1 to be set up.

Instead of the run-on surfaces 18, 19 being designed as sloping run-on surfaces 18, 19, it is also conceivable for said run-on surfaces 18, 19 to be of any other shape which causes the blocks 15 to perform a turning movement in order to pass into the central part 17, with the desired alignment.

A further sorting arrangement (not illustrated) may be arranged downstream of the sorting arrangement 1. This may be advantageous if there are no significant differences between the height, width and length of the blocks 15. This is because, in this case, it may not be possible, in some cases, for sorting to be carried out by the strip 12 in order to avoid upended blocks 15 from entering into the sorting part 3. If this is the case, the upended blocks 15 arriving at the end of the sorting part 3 may be correspondingly aligned subsequently by this further sorting arrangement (not illustrated).

I claim:

1. An apparatus for sorting blocks made of concrete or concrete-like material, in particular paving slabs, having a vibration arrangement and a sorting arrangement which slopes with respect to the horizontal and has an entry part for the blocks which are to be sorted and a sorting part, which has at least one collecting channel running in the conveying direction, wherein the collecting channel has a central part between a pair of adjacent sloping run-on surfaces arranged thereon, the width of the central part corresponding at least approximately to one of the two shorter edge lengths of the blocks which are to be sorted, and wherein the run-on surfaces are provided with stop elements, the stop elements on one run on surface being offset in the longitudinal direction with respect to the stop elements on the adjacent run-on surface.

2. The apparatus for sorting blocks as claimed in claim 1, wherein each stop element arranged on one run-on surface is spaced apart from the next stop element in the conveying direction, which is arranged on the other run-on surface, by a distance which corresponds at least to the width of the blocks which are to be sorted.

3. The apparatus for sorting blocks as claimed in claim 1, wherein the distance between the stop elements arranged on one run-on surface and the opposite lateral border of the central part corresponds at most to the length of the blocks which are to be sorted.

4. The apparatus for sorting blocks as claimed in claim 1, wherein the vibration arrangement has two motors which run in opposite directions and are each provided with an unbalance element, each of which is arranged on a shaft, which has a horizontal axis, for producing directed vibration.

5. The apparatus for sorting blocks as claimed in claim 1, wherein the stop elements are stop pins which project from the sloping run-on surfaces.

6. The apparatus for sorting blocks as claimed in claim 5, wherein the stop pins are arranged essentially perpendicularly with respect to the base of the sorting part.

7. The apparatus for sorting blocks as claimed in claim 1, wherein the stop elements are stop cones.

8. The apparatus for sorting blocks as claimed in claim 1, wherein a plurality of collecting channels are arranged parallel alongside one another, the sloping run-on surfaces between adjacent collecting channels being at least approximately in roof form or trapezoidal form.

9. The apparatus for sorting blocks as claimed in claim 1, wherein the strip is arranged between the entry part and the sorting part such that, between the base of the entry part and the strip, there is a through-passage which corresponds at least to the height of the blocks which are to be sorted.

10. The apparatus for sorting blocks as claimed in claim 1, wherein a further sorting arrangement is arranged downstream of the sorting arrangement in the conveying direction.

11. The apparatus for sorting blocks as claimed in claim 1, wherein the vibration arrangement has a motor which is provided with unbalance elements which are arranged on a shaft, which has a horizontal axis.

* * * * *